United States Patent [19]
Yoshikawa et al.

[11] Patent Number: 5,669,596
[45] Date of Patent: Sep. 23, 1997

[54] DIAPHRAGM VALVE

[75] Inventors: Kazuhiro Yoshikawa; Tetsuya Kojima, both of Osaka, Japan

[73] Assignee: Fujikin Incorporated, Osaka, Japan

[21] Appl. No.: 558,697

[22] Filed: Nov. 14, 1995

[30] Foreign Application Priority Data

Feb. 15, 1995 [JP] Japan .................................. 7-027135

[51] Int. Cl.⁶ .................................................. F16K 31/00
[52] U.S. Cl. .................................................. 251/335.2
[58] Field of Search .................................. 251/335.2

[56] References Cited

U.S. PATENT DOCUMENTS

| | | | |
|---|---|---|---|
| 4,231,549 | 11/1980 | Visalli | 251/335 A |
| 4,671,490 | 6/1987 | Kolenc et al. | 251/335.2 |
| 4,750,709 | 6/1988 | Kolenc et al. | 251/335.2 |

*Primary Examiner*—A. Michael Chambers
*Attorney, Agent, or Firm*—Griffin, Butler, Whisenhunt & Kurtossy

[57] ABSTRACT

A diaphragm valve comprises a body having an inflow passage, outflow passage, valve chamber and valve seat, a metallic diaphragm for maintaining air-tightness of the valve chamber, a bonnet for securely holding the edge portion of the outer circumference of the metallic diaphragm in cooperation with the body, a stem inserted through and supported by the bonnet but movable up and down, and a valve disk inserted through a center opening in the metallic diaphragm. The valve disk comprises a seat portion of disk-like shape contacting with and moving away from the valve seat, a shaft portion provided on the top surface of the seat portion and inserted through the opening in the diaphragm, and a connecting portion provided at the top end of the shaft portion and connected to the bottom end portion of the stem. An end edge portion of the inner circumference of the diaphragm is welded to the disk valve shaft portion over the entire circumference of the shaft portion at a location spaced from the seat portion so that a large gap exists between the upper surface of the seat portion and the lower surface of the diaphragm, thereby improving gas substitution performance.

17 Claims, 12 Drawing Sheets

DIAPHRAGM VALVE

FIELD OF THE INVENTION

The invention relates to a diaphragm valve of a type used, for example, in fluid pipe lines in semiconductor manufacturing plants, nuclear power plants and medicine and food manufacturing equipment, and relates more particularly to a diaphragm valve wherein a valve chamber is sealed by a metallic diaphragm welded to a valve disk.

BACKGROUND OF THE INVENTION

Diaphragm valves of the type having a valve chamber which is sealed by a metallic diaphragm are used extensively in pipelines handling gas of high purity, such as the pipe lines in semiconductor manufacturing plants. Diaphragm valves of this type are disclosed in U.S. Pat. No. 4,671,490 and Japanese Provisional Publication no. 288786/87.

Referring to FIG. 12, the prior art diaphragm valve comprises an inflow passage 15a, an outflow passage 15b, a body 15 having a valve chamber 15c and a valve seat 15d, a metallic diaphragm 16 for sealing the valve chamber 15c, a bonnet 17, a bonnet nut 18 for securely holding the edge portion of the outer circumference of the metallic diaphragm 16 against the body 15, a cylinder 19 rotatably supported on the bonnet 17 so as to be immovable in the axial direction, a stem 20 threadedly engaged in and supported by the cylinder 19, a handle 21 attached to the cylinder 19, and a valve disk 22 connected to a bottom end portion of the stem 20. As the cylinder 19 is rotated by the handle 21, the stem 20 moves up or down thus moving metallic diaphragm 16 and valve disk 22 up or down. As valve disk 22 moves up or down, a seat 23 provided on the valve disk 22 moves away from, or moves into contact with, the valve seat 15d thereby opening the valve to permit fluid flow between the passages 15a, 15b or closing the valve to block fluid flow.

Because the inner edge portion of the inner circumference of the metallic diaphragm 16 is welded to the valve disk 22 and the edge portion of the inner circumference of the metallic diaphragm 16 is securely held between a metal fitting 24 and the valve disk, the diaphragm valve exhibits excellent operating characteristics including, among others, sure prevention of fluid leakage from the edge portion of the inner circumference of the metallic diaphragm 16.

However, because the valve is so constructed that the edge portion of the inner circumference of the metallic diaphragm 16 is securely held between the holding metal fitting 24 and valve disk 22, a gap is unavoidably formed between the bottom surface of the metallic diaphragm 16 and the top surface of valve disk 22. As a result, fluid is easily trapped in the gap, making it difficult to remove the fluid which is caught in the gap. This poses a problem in cases where different gases are alternately applied to the valve and any residual first gas in the valve must be removed before a second gas is applied, or where all residual gas in the valve must be extracted at some point in a process. Because the top surface of valve disk 22 has a curved shape, a horizontally deep annular gap having a small vertical dimension is formed between the top surface of disk 22 and the bottom surface of the metallic diaphragm 16. The gap is narrow in height and becomes increasingly smaller, until it is practically non-existent where the holding metal fitting clamps the lower surface of the diaphragm against the upper surface of the valve disk. Therefore it is difficult to completely remove residual gas from the valve.

Furthermore, since the edge portion of the inner circumference of the metallic diaphragm 16 is clamped or securely held between the holding metal fitting 24 and the disk 22, the holding metal fitting becomes necessary thereby increasing the number of parts in the valve.

SUMMARY OF THE INVENTION

An object of the present invention is to provide a metallic diaphragm valve which does not exhibit the gas substitution problems of the prior art.

A further object of the invention is to provide a metallic diaphragm valve requiring fewer parts for securing the diaphragm to a valve disk.

An object of the invention is to provide a diaphragm valve comprising a valve body having formed therein a valve chamber communicating with an inflow passage and an outflow passage, a metallic diaphragm, a bonnet secured to the valve body and clamping the outer peripheral edge of the diaphragm against the valve body to provide an air-tight seal for the chamber, a stem supported by the bonnet so as to be movable up and down in an axial direction through the bonnet, and a valve disk extending through a central opening in the diaphragm, the valve disk having a top portion engaging the stem so that the valve disk moves with the stem, a bottom disk-like seat portion for closing the inflow passage when the stem is moved downwardly, and a shaft portion connecting the top and bottom portions and extending through the opening in the diaphragm, the inner peripheral edge of the diaphragm being fixed to, and integrated with the shaft portion by a weld joint extending around the entire circumference of the shaft portion above the seat portion but spaced therefrom so that no small gap is formed between the diaphragm and the seat portion.

Another object of the invention is to provide a metallic diaphragm valve as described above wherein the edge portion of the inner periphery of the diaphragm is bent downwardly and contacts the shaft portion of the valve disk, and the end edge surface of the inner periphery of the diaphragm is fixed to, and integrated with, the shaft portion of the valve disk by a weld. Preferably, an annular projection is provided on the outer circumferential surface of the shaft portion of the valve disk at a position spaced from the upper surface of the valve disk seat portion and the end edge portion of the diaphragm is welded to the annular projection.

In a another embodiment, the valve disk has a portion with an enlarged diameter, and a land or ledge underneath the enlarged diameter portion and spaced from the upper surface of the valve disk seat portion, the inner peripheral portion of the diaphragm being bent downwardly and inwardly and fixed to the valve disk by a weld joint at the ledge.

In a further embodiment, the valve disk has a radially outwardly extending support portion located above the diaphragm to provide a backing support for the diaphragm.

Other objects and advantages of the invention and the manner of making and using it will become obvious upon consideration of the following description and the accompanying drawings.

DESCRIPTION OF PREFERRED EMBODIMENTS

Figure 1:
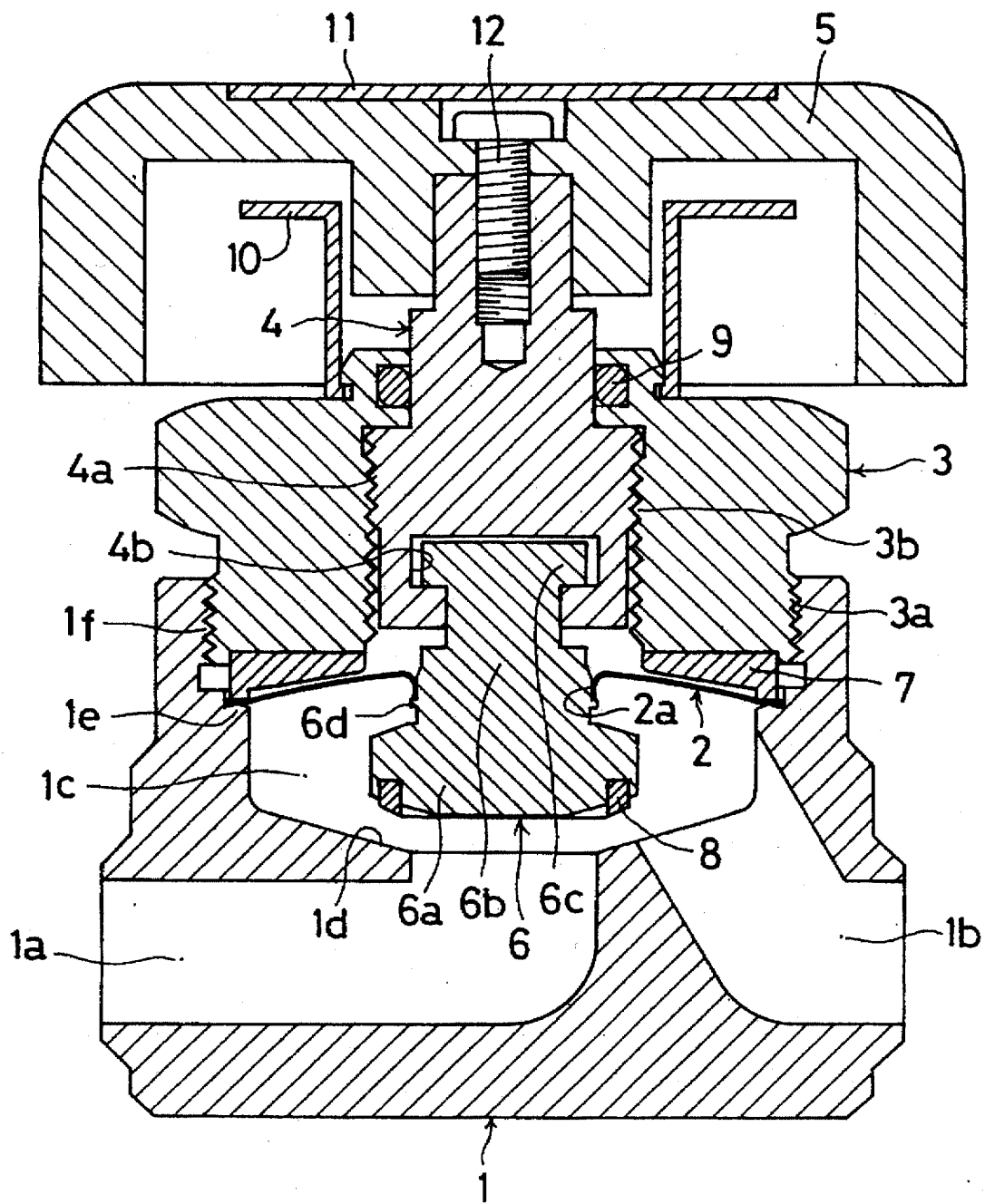
FIG. 1 is a longitudinal sectional view of a diaphragm valve according to a first embodiment of the invention.
Figure 2:
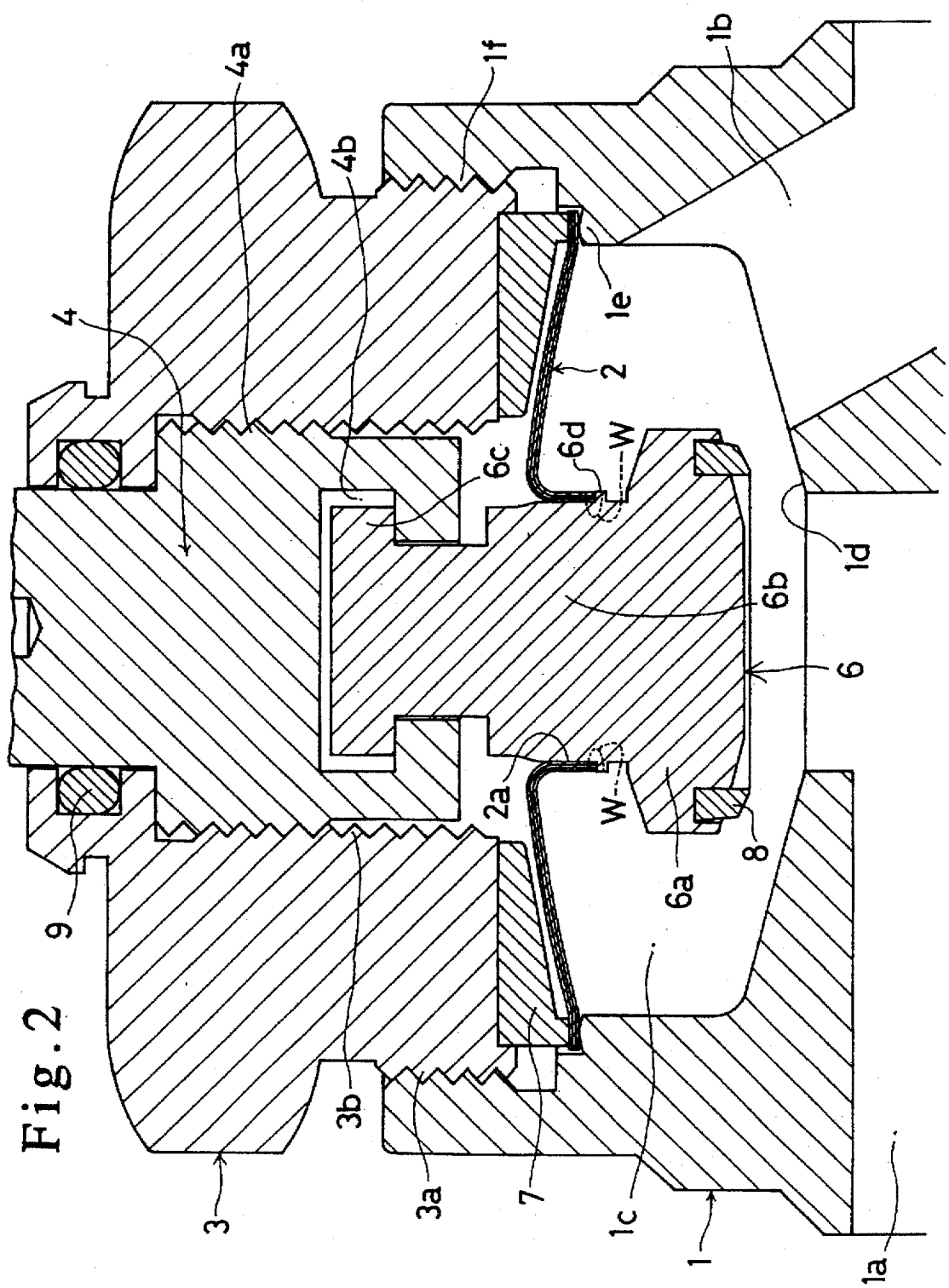
FIG. 2 is a sectional view, on an enlarged scale, of a portion of the diaphragm valve shown in FIG. 1.
Figure 3:
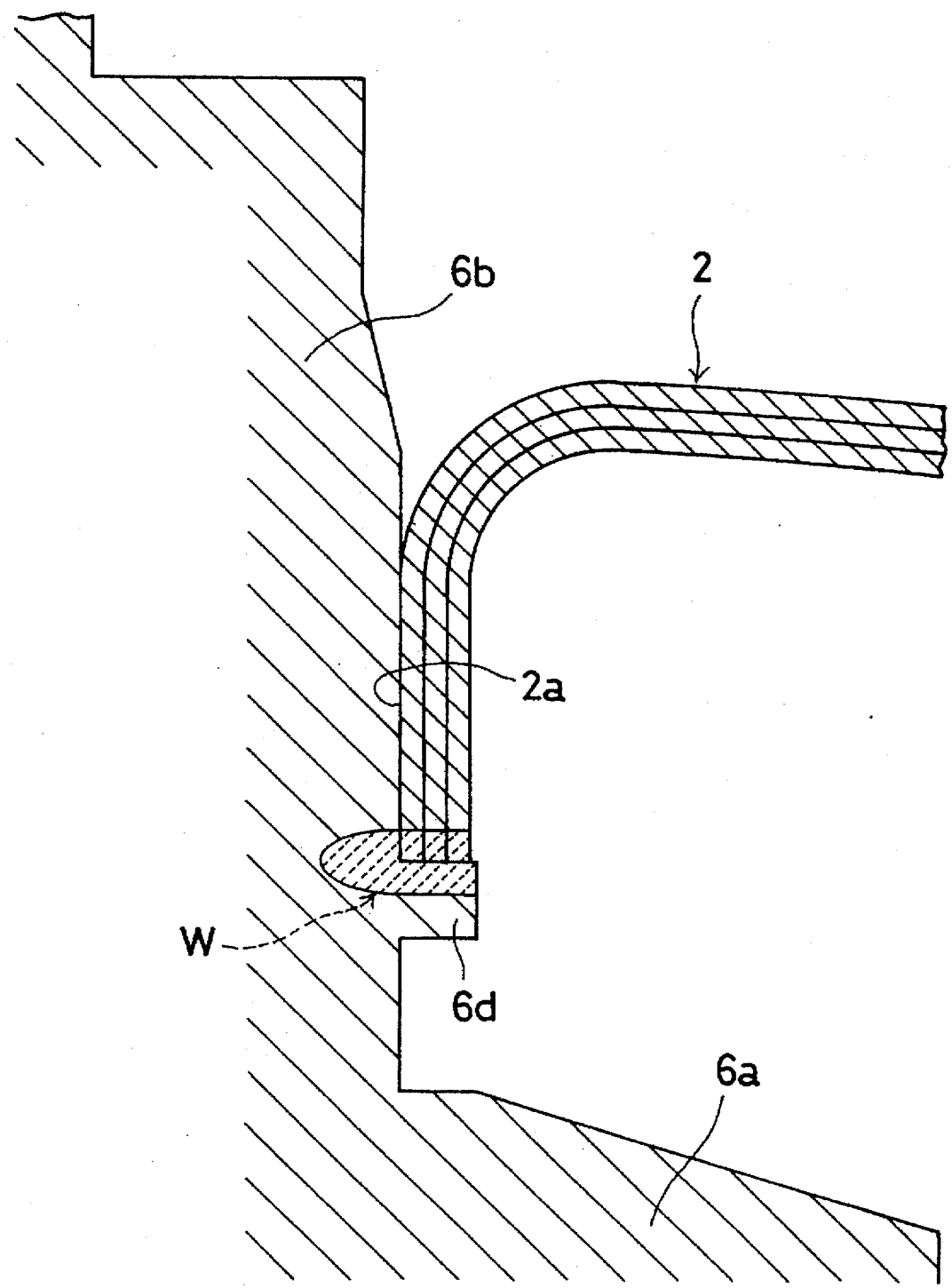
FIG. 3 is an expanded longitudinal sectional view of a welded portion of the metallic diaphragm and the valve disk of a diaphragm valve according to the first embodiment.

FIGS. 1–3 illustrate a diaphragm valve according to a first embodiment of the present invention. The diaphragm valve comprises a valve body 1, a metallic diaphragm 2, a bonnet 3, a stem 4, a handle, a valve disk 6 and a bonnet insert 7.

The valve body 1 is almost block-like in shape and may be made of a metallic material such as stainless steel. Formed within the body 1 are an inflow passage 1a, an outflow passage 1b, and a concave valve chamber 1c. The valve chamber 1c is open to the top of body 1 and at the bottom it communicates with the passages 1a, 1b. The bottom surface of valve chamber 1c is tapered to form a valve seat 1d around the opening of the inflow passage 1a. A step 1e is provided on the surface of the inner circumference of the valve chamber 1c and the edge portion of the outer circumference of the diaphragm 2 rests on the step. Above the step 1e the body 1 is provided with a female thread 1f for receiving a male thread 3a provided on the bonnet 3. The bonnet insert 7 is disposed underneath bonnet 3 and preferably has a downwardly extending annular projection for clamping the outer circumferential edge portion of diaphragm 2 against step 1e as the bonnet is tightened onto the valve body, thereby providing an air-tight seal.

The metallic diaphragm 2 comprises a plurality of thin metallic plates, dish-like in shape and laid one on top of another. The plates may be 0.1 mm to 0.2 mm thick, for example, and made from a material such as stainless steel (SUS316L for example) or Inconel™. The center portion of the metallic diaphragm 2 has a mounting hole 2a through which a shaft portion 6b of valve disk 6 inserted. The edge portion of the inner circumference of diaphragm 2 is bent downwardly and contacts the outer circumferential surface of shaft portion 6b.

The bonnet 3 is almost cylindrical in shape and may be made from a metallic material such as stainless steel. The bonnet has, in addition to the threads 3a for securing it to the body 1, female threads 3b formed on its inner circumferential surface for engaging male threads 4a provided on stem 4.

The stem 4 is formed almost in a shaft-like shape from a metallic material such as stainless steel. The stem 4 is inserted into and engaged with the female thread portion 3b of the bonnet 3 and is rotatable and movable up and down in the bonnet. The handle 5 is attached to the top end portion of stem 4 by a set screw 12. At the lower end portion of the stem 4 a cavity 4b is formed so as to engage a connecting portion 6c of the valve disk 6. The engagement of valve disk portion 6c in cavity 4b is such that the stem is rotatable relative to the valve disk but the valve disk moves with the stem as the stem moves up or down in the axial direction.

The valve disk 6 is a monolithic structure, circular in configuration, and in a plane including its axis it has a cross section approximating the shape of an inverted letter T. The valve disk may be made of a metallic material such as stainless steel (SUS316L). Valve disk 6 comprises, in addition to shaft portion 6b and connecting portion 6c, a seat portion 6a having a large diameter disk-like shape with an annular valve seat 8 fitted on its bottom surface. Shaft portion 6b is joined at its lower extremity to the center portion of the top surface of the seat portion 6a, and is joined at its upper extremity to the connecting portion 6c which is also disk-like in shape. An annular rib or projection 6d is provided on the outer circumferential surface of the shaft portion 6b, the rib being spaced a fixed distance from the top surface of the seat portion 6a.

The inner circumferential portion of diaphragm 2 surrounding mounting hole 2a extends downwardly parallel to the outer circumferential surface of shaft portion 6b and the end edge portion of the inner circumferential portion of the diaphragm 2 is fastened to and integrated with the valve disk by a weld joint W. As shown in FIGS. 2 and 3, the shaft portion 6b of the valve disk 6 is inserted through the mounting hole 2a from the bottom side of the diaphragm 2 until rib 6d is in contact with the end face of the edge portion of the inner circumference of the diaphragm. The edge portion of diaphragm 2 is then fixed to and integrated with the rib by welding to form weld joint W extending around the entire circumference of shaft portion 6b. As the result, the end edge portion of the inner circumference of the diaphragm 2 is fixed to shaft portion 6b at a location spaced from the seat portion 6a so that no small gap exists between the diaphragm and the seat portion.

The conditions under which the electron beam welding is carried out are properly chosen in known manner so that the diaphragm 2 is securely welded to the valve disk 6 without welding defects and without deformation or distortion of the diaphragm and/or the valve disk. Electron beam welding is generally suitable for the aforementioned welding because it (1) produces minimum deformation and distortion in the weld zone due to small welding heat input with the resultant minimum harmful effects on the diaphragm 2 and valve disk 6, (2) provides precision welding due to a narrow weld zone, and (3) it provides the capability of welding thick pieces due to deep penetration of melting.

After the diaphragm 2 is welded to valve disk 6, the valve is assembled in a generally conventional manner. Connecting portion 6c of the valve disk is passed through the opening in bonnet insert 7 and engaged in the cavity 4b in stem 4. An O-ring 9 is positioned in a groove in bonnet 3 and the bonnet is turned relative to the stem to screw the stem into the bonnet. The entire assembly is the positioned over the chamber 1c and the bonnet 3 screwed into the valve body 1. As the bonnet is tightened onto the valve body, the diaphragm 2 is clamped between bonnet insert 7 and step 1e so that an air-tight seal is formed between the outer bottom peripheral surface of the diaphragm and step 1e. Handle 5 may then be attached to stem 4 using set screw 5. Elements 10 and 11 form no part of the present invention, element 10 being provided for indicating the open/closed position of the valve and the element 11 being a name plate.

As handle 5 is turned to rotate stem 4, screw threads 3b, 4a cause the stem to move upwardly or downwardly depending on the direction of rotation of the handle. The stem rotates freely about connecting portion 6c of valve disk 6 but as the stem moves axially the upper or lower surface of cavity 4b engages connecting portion 6c so that the valve disk is moved axially and diaphragm 2 is deformed elastically in the vertical direction. FIG. 1 shows the valve in the open position in which fluid may flow between passages 1a and 1b through chamber 1c. When stem 4 is moved down, the seal 8 engages the surface 1d around the region where passage 1a joins chamber 1c, thereby blocking fluid flow between the passages.

Because the end edge portion of the inner circumference of the metallic diaphragm 2 is fixed to valve disk shaft portion 6b at a position spaced in the upward direction from seat portion 6a, there is no narrow gap formed between the bottom surface of diaphragm 2 and the top surface of the valve disk seat portion 6a in which gas may be trapped. As a result, gas substitution performance of the diaphragm valve according to the present invention is greatly improved as compared to that of a conventional diaphragm valve.

Also, because the edge portion of the inner circumference of the diaphragm 2 is bent downward and contacts with the surface of the outer circumference of the valve disk shaft portion 6b, bending stress generated during elastic deformation or bending of the diaphragm occurs in the curved portion of the diaphragm (FIG. 3) which is spaced from the weld zone. As a result, no large stress is applied to the weld zone so that cracks are not easily formed in the weld zone. Furthermore, the durability of the diaphragm 2 is increased.

A further advantage of the invention is that fewer parts are required as compared to diaphragm valves of the prior art. Because the end edge portion of the inner circumference of the metallic diaphragm 2 and the valve disk 6 are welded together, it is not necessary to provide a holding metal fitting to clamp the edge portion of the inner circumference of the diaphragm to the valve disk as is done in conventional diaphragm valves.

Figure 4:
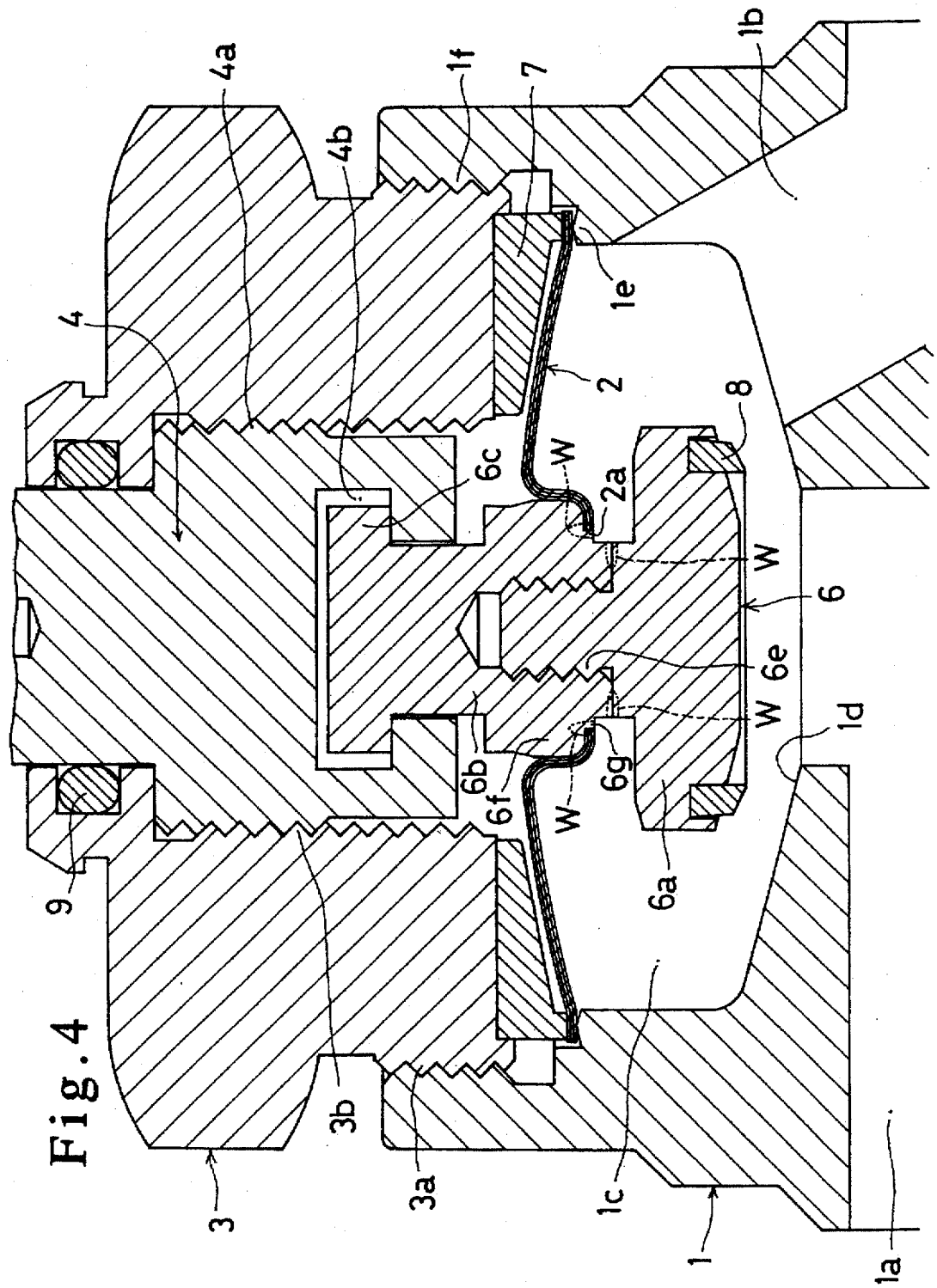
FIG. 4 is an expanded sectional view of a portion of a diaphragm valve according to a second embodiment of the invention.
Figure 5:
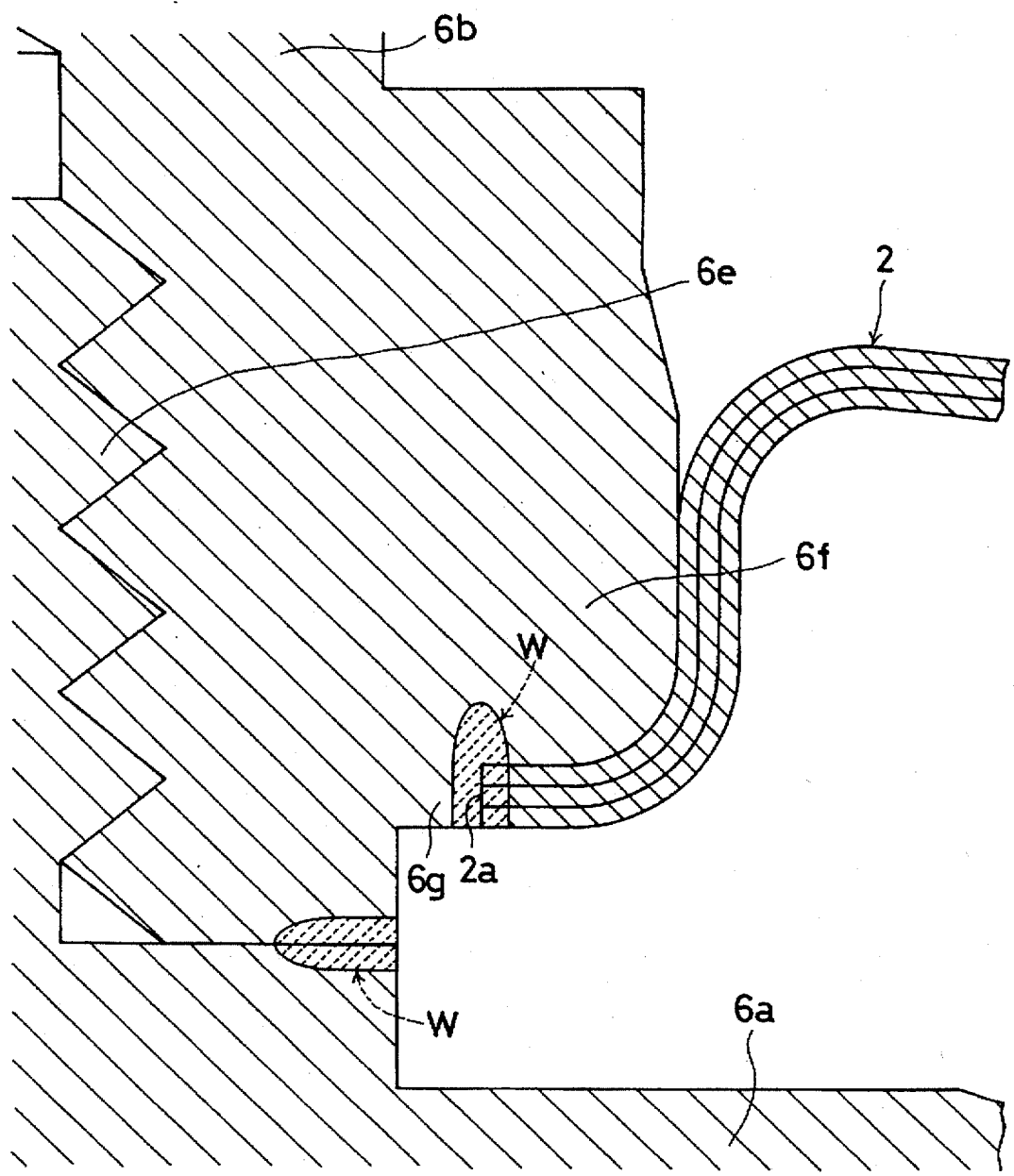
FIG. 5 is an expanded longitudinal sectional view of a welded portion of the metallic diaphragm and the valve disk of a diaphragm valve according to the second embodiment.

The structure of valve disk 6 and the manner in which the diaphragm 2 is shaped and attached to the valve disk may be varied. As shown in FIGS. 4 and 5, the valve disk 6 may comprise a first member having a seat portion 6a with a male threaded portion 6e extending upwardly therefrom, and a second, monolithic member having a shaft portion 6b and a connecting portion 6c. Shaft portion 6b has a center opening with female threads for receiving the male threaded portion 6e.

As in the previously described embodiment, seat portion 6a has a large diameter disk-like shape and its bottom surface is fitted with an annular seat 8. Connecting portion 1c extends from the top of shaft portion 6b and is positioned in cavity 4b of stem 4 so as to move up and down with the stem.

The valve disk shaft portion 6b is formed with a large diameter portion 6f for contacting the edge portion of the inner circumference of the metallic diaphragm 2. A step 6g is formed at the bottom surface of portion 6f and the end face of the edge portion of the inner circumference of the diaphragm 2 rests against the step.

As in the first embodiment, the valve disk shaft portion extends through a central opening provided in the plates comprising the diaphragm 2. However, in the embodiment of FIGS. 4 and 5, the edge portion of the inner circumference of the diaphragm 2 is bent in the downward direction and then inwardly toward the valve disk shaft portion 6b so as to contact the outer circumference and the bottom surface of the large diameter portion 6f.

The end edge portion of the inner circumference of the diaphragm 2 and the valve disk shaft portion 6b are fastened and integrated by a circumferential weld W so as to form an air-tight joint.

The diaphragm 2 and the valve disk 6 are assembled by first inserting the lower end portion of shaft portion 6b through the mounting hole 2a from the top side of the diaphragm until the edge portion of the inner circumference of the diaphragm contacts the outer circumference and the bottom surface of the large diameter portion 6f. The end face of the edge portion of the diaphragm 2 is allowed to rest on the step 6g. The end edge of the diaphragm 2 is then welded to the large diameter portion 6f by an electron beam directed from below.

After the diaphragm is welded to the large diameter portion 6f, the threaded portion 6e of the seat portion 6a is screwed into the bottom of shaft portion 6b until the bottom surface of shaft portion 6b abuts the top surface of seat portion 6a. The shaft portion and seat portion are then fastened together and integrated by welding with an electron beam so as to form a weld joint W around the entire circumference of the valve disk.

The diaphragm valve of FIG. 4 operates in the same way and provides the same advantages as the diaphragm valve shown in FIG. 1. Because the edge portion of the inner circumference of the diaphragm 2 is bent downward and further bent inward in order to weld the edge portion of the inner circumference of the diaphragm 2 to the shaft portion 6b, the bending stress generated at the time of elastic deformation of the diaphragm occurs at a position distanced from the weld zone hence it more unlikely that the stress will be applied to the weld zone. Therefore, the durability of the diaphragm of FIG. 4 is further improved.

Figure 6:
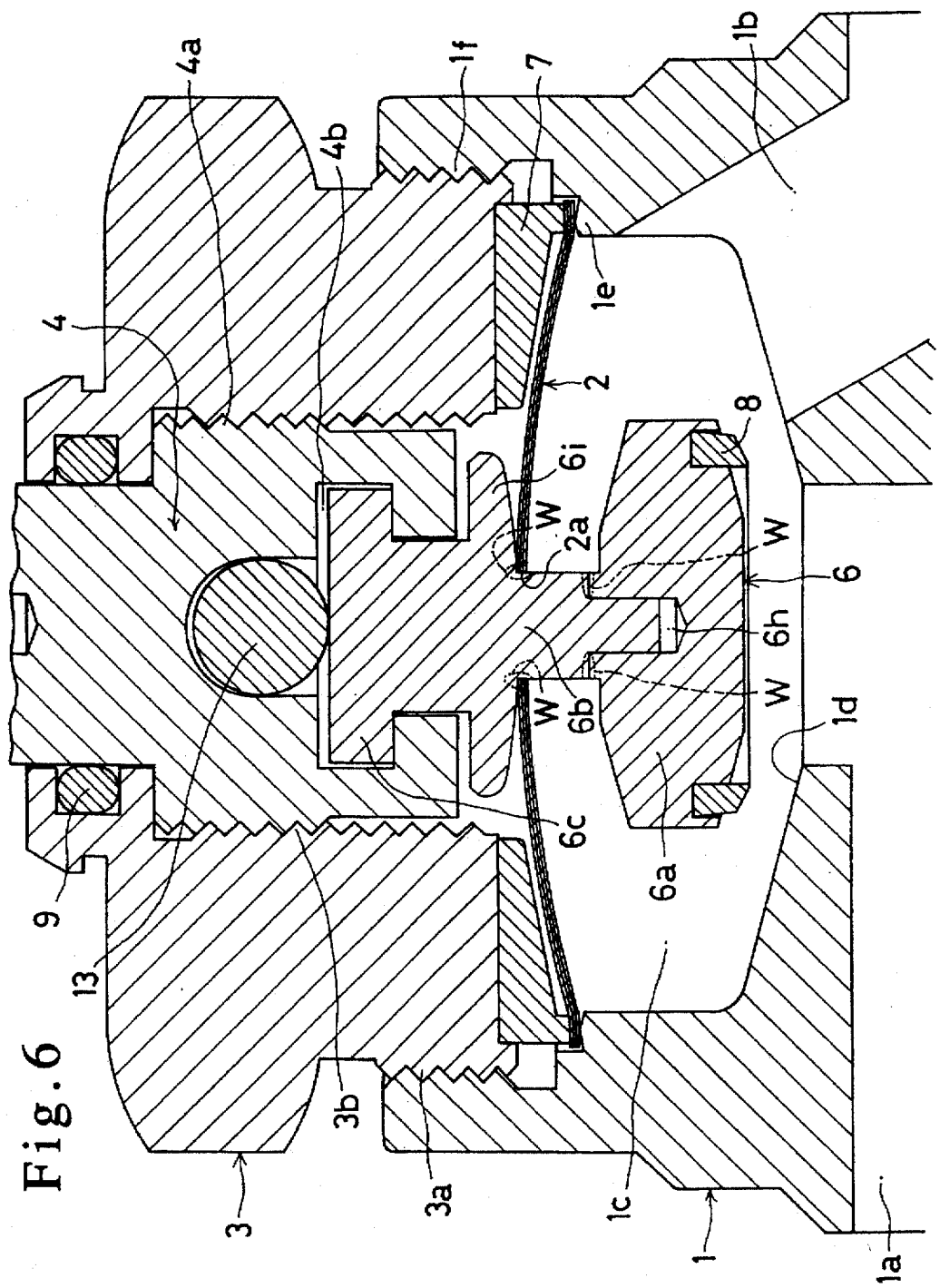
FIG. 6 is an expanded sectional view of a portion of a diaphragm valve according to a third embodiment of the invention.
Figure 7:
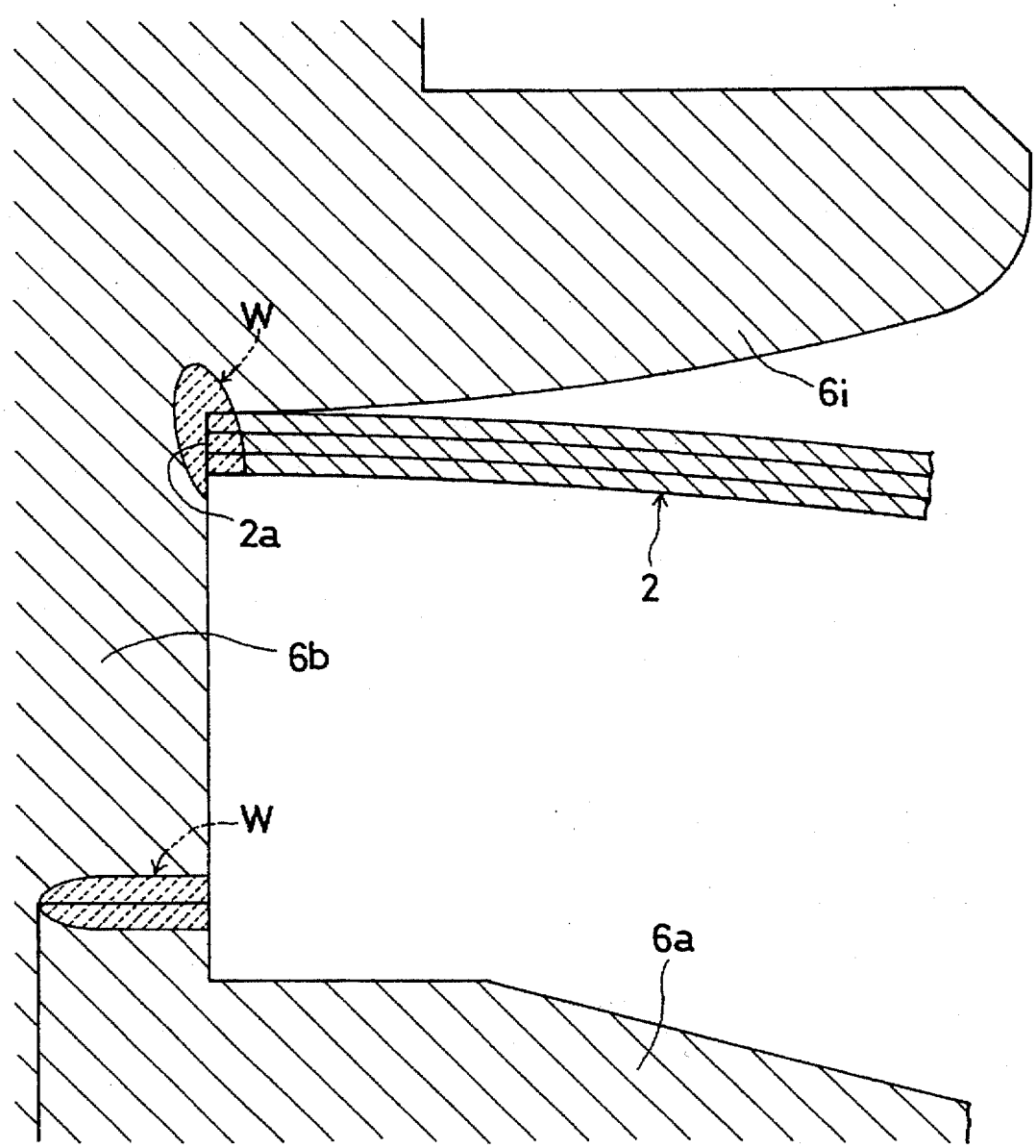
FIG. 7 is an expanded longitudinal sectional view of a welded portion of the metallic diaphragm and the valve disk of a diaphragm valve according to the third embodiment.

FIGS. 6 and 7 show a portion of a diaphragm valve according to a third embodiment which differs from the previously described embodiments in several respects. Firstly, the inner edge portion of the metallic diaphragm 2 is not bent downwardly. Secondly, valve disk 6 has an annular support portion 6i monolithically formed with the shaft portion 6b and connecting portion 6c. Thirdly, the valve disk seat portion 6a is provided with a hole 6h in its upper surface for receiving a bottom part of shaft portion 6b having a reduced diameter. Finally, the upper surface of stem cavity 4b is recessed to receive a ball 13, the purpose of this ball being to reduce friction between the top surface of cavity 4b and the top surface of valve disk connecting portion 6c as the stem 4 is rotated relative to the valve disk 6.

The metallic diaphragm 2 is mounted on the valve disk 6 by inserting the shaft portion 6b through the diaphragm mounting hole 2a from the top until the upper surface of the inner peripheral portion of the diaphragm abuts the lower surface of support portion 6i where the support portion joins the shaft portion 6b, and the inner circumference end edge portion of the diaphragm abuts the shaft portion 6b as shown in FIG. 7. The diaphragm is then joined to shaft portion 6b and support portion 6i by an electron beam directed upwardly from underneath the diaphragm to form a circumferential weld W extending around the periphery of the shaft portion.

After the diaphragm is welded to the shaft portion 6b, the lower end of the shaft portion is inserted into hole 6h in the seat portion 6a so that the shaft portion abuts the upper surface of the seat portion. The shaft portion and the seat portion are then fastened together by another circumferential weld W.

The diaphragm valve shown in FIG. 6 has the same advantages as the first embodiment described above. The annular supporting portion 6i serves as a back support for the portion of diaphragm 2 that bends as the diaphragm is elastically deformed during up/down movement of valve disk 6. Therefore, no sharp bending of the diaphragm occurs and the durability of the diaphragm is further improved.

Figure 8:
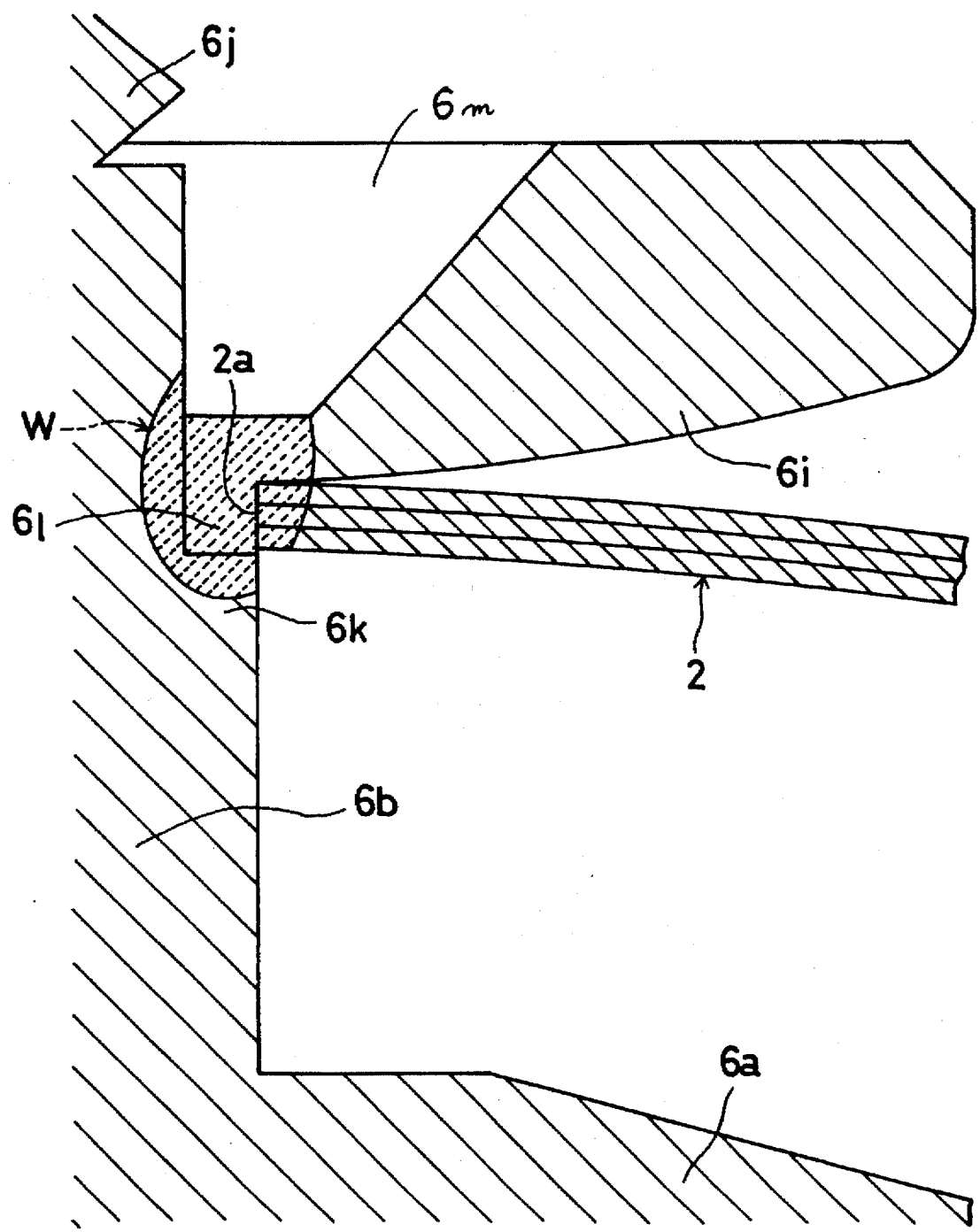
FIG. 8 is an expanded sectional view of a portion of a diagram valve according to a fourth embodiment of the invention.
Figure 9:
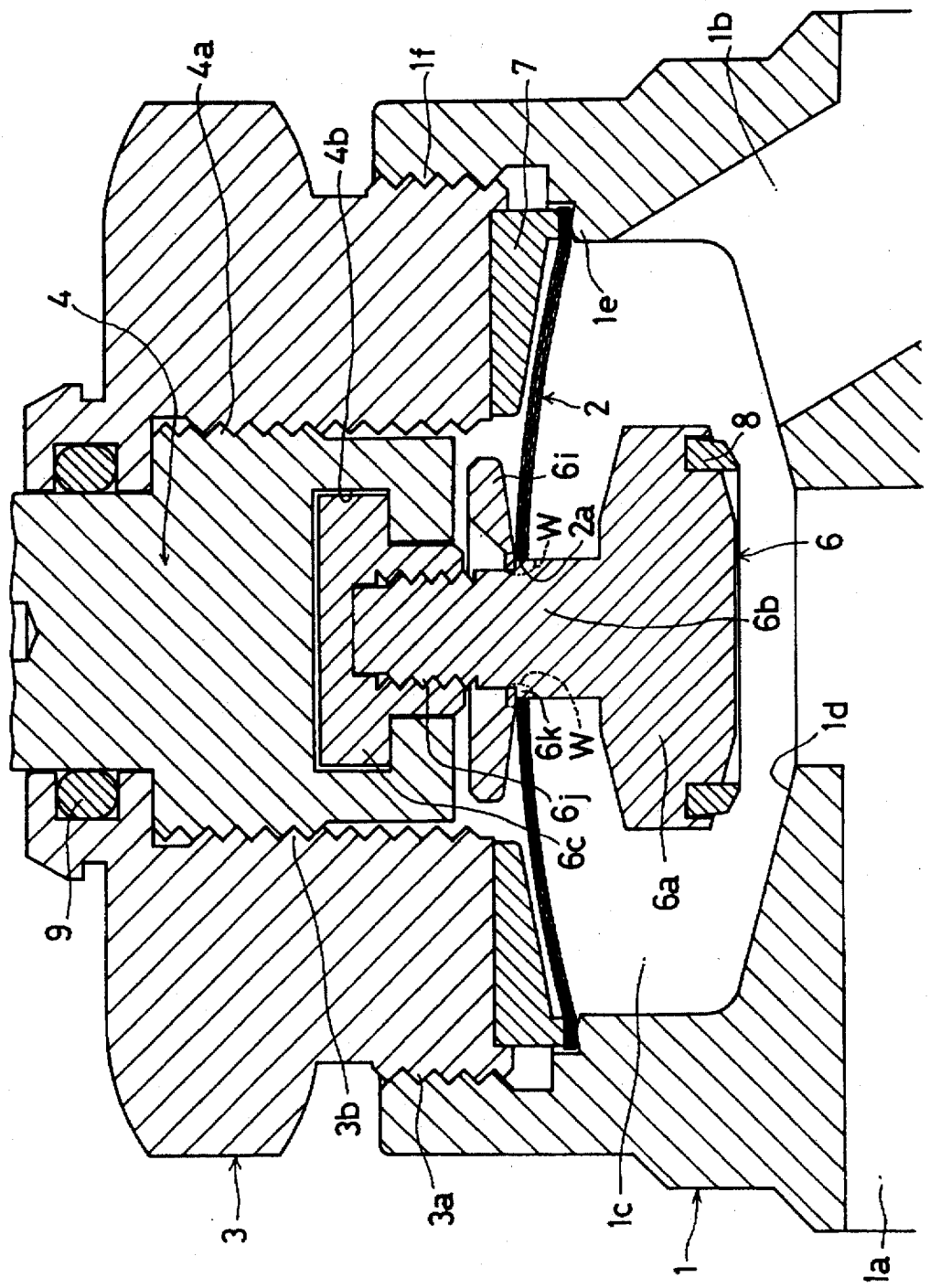
FIG. 9 is an expanded longitudinal sectional view of a welded portion of the metallic diaphragm and the valve disk of a diaphragm valve according to the fourth embodiment.

FIGS. 8 and 9 illustrate a fourth embodiment of the invention. In this embodiment the valve disk connecting portion 6c comprises one element and is provided with an internally threaded hole for receiving the upper end of valve disk shaft portion 6b which has external threads 6j. The shaft portion 6b and seat portion 6c comprise a second, monolithic element.

The shaft portion 6b is provided with a step 6k on its outer circumferential surface, the step 6 being spaced from the top surface of the seat portion 6a by a distance sufficient to enable easy removal of gas from the region adjacent shaft portion 6b and between the bottom of diaphragm 2 and the top surface of seat portion 6a.

The valve disk support portion 6i is initially a separate element from the valve disk shaft portion 6b. The support portion includes an annular stepped hub 61 which contacts the step 6k on the shaft portion 6b when the support portion is lowered onto the shaft portion. From hub 61, the support portion 6i extends outwardly and upwardly so that it exhibits a disk-like shape. The outer circumference of hub 61 is such that it contacts the inner peripheral surface of diaphragm 2 surrounding the mounting hole 2a.

The diaphragm 2 and valve disk 6 are assembled by lowering the diaphragm 2 onto shaft portion 6b from the top. The support portion 6i is then lowered onto shaft portion 6b from the top until the hub 61 engages step 6k and is positioned within the mounting hole 2a in the diaphragm. As shown in FIG. 9, shaft portion 6b, the inner periphery of diaphragm 2, and the hub 61 are then fixed to each other by an electron beam directed toward the parts from above through the opening in the support portion 6i. The weld joint W extends around the entire outer circumference of shaft portion 6b.

After the diaphragm 2, shaft portion 6b and support portion 6i have been welded together, the connecting portion 6c is screwed onto the top of the shaft portion.

The diaphragm valve shown in FIG. 8 operates in the same way, and has the same advantage as the embodiment shown in FIG. 1. In addition, because the diaphragm 2, the disk valve shaft portion 6b and the supporting portion 6i are welded from a position above the diaphragm, metallic components and the like which evaporate during welding cannot attach to those surfaces of the diaphragm and valve disk which subsequently contact fluid passing through chamber 1c. Therefore, it is possible to maintain the purity of fluid flowing through the diaphragm valve. In addition, only one welding operation is necessary, in contrast to the third embodiment described above.

Furthermore, because the valve disk 6 is provided with the annular supporting portion 6i for supporting the region of the metallic diaphragm 2 that is deformed elastically as the stem 4 moves up or down, there is less likelihood that a sharp bend will occur in the diaphragm, and the durability of the diaphragm is improved.

Figure 10:
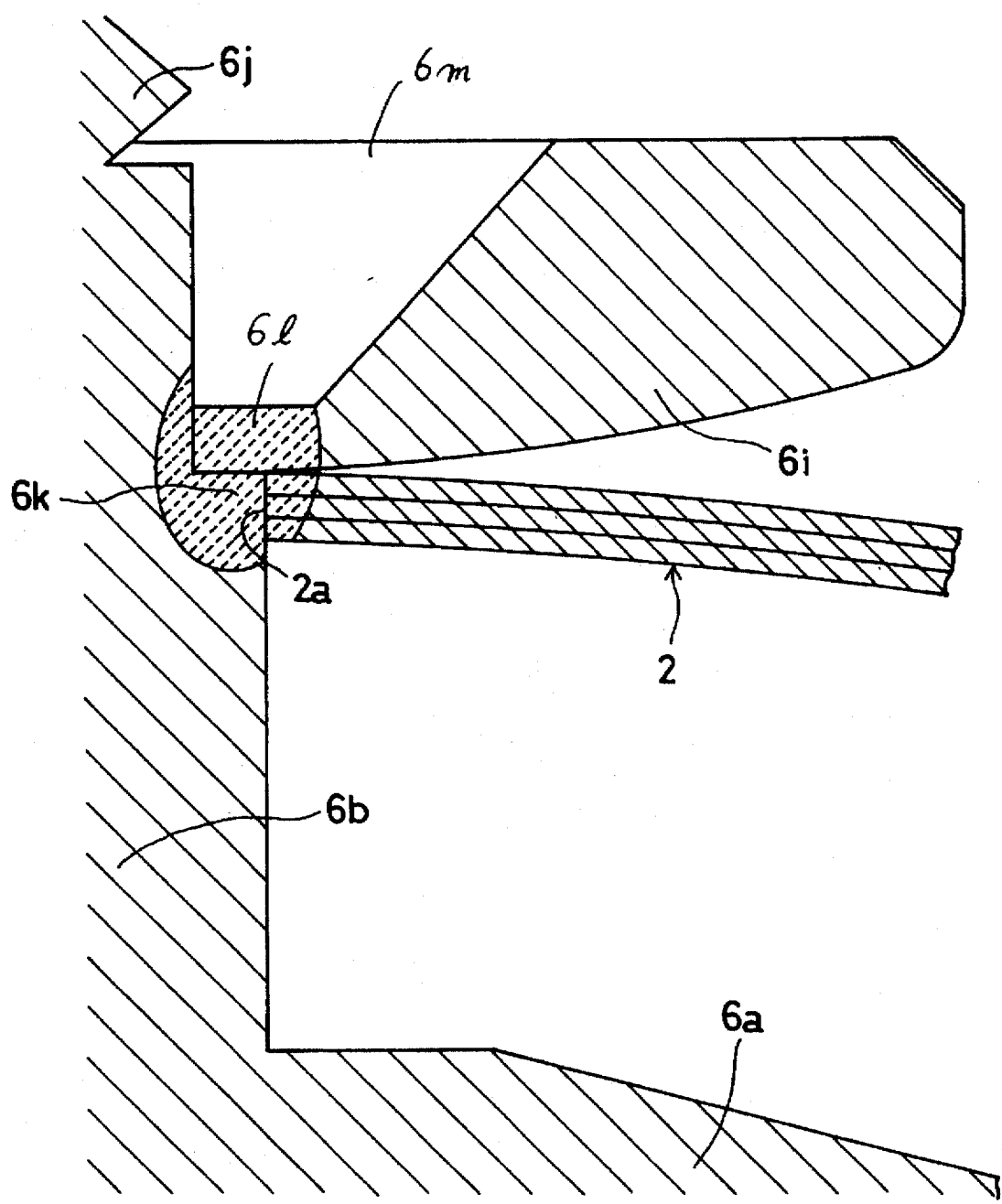
FIG. 10 is an expanded longitudinal sectional view of a welded portion of the metallic diaphragm and the valve disk of a diaphragm valve according to the fifth embodiment; and, FIGS. 11 and 12 are longitudinal sectional views of a conventional diaphragm valve.
Figure 11:
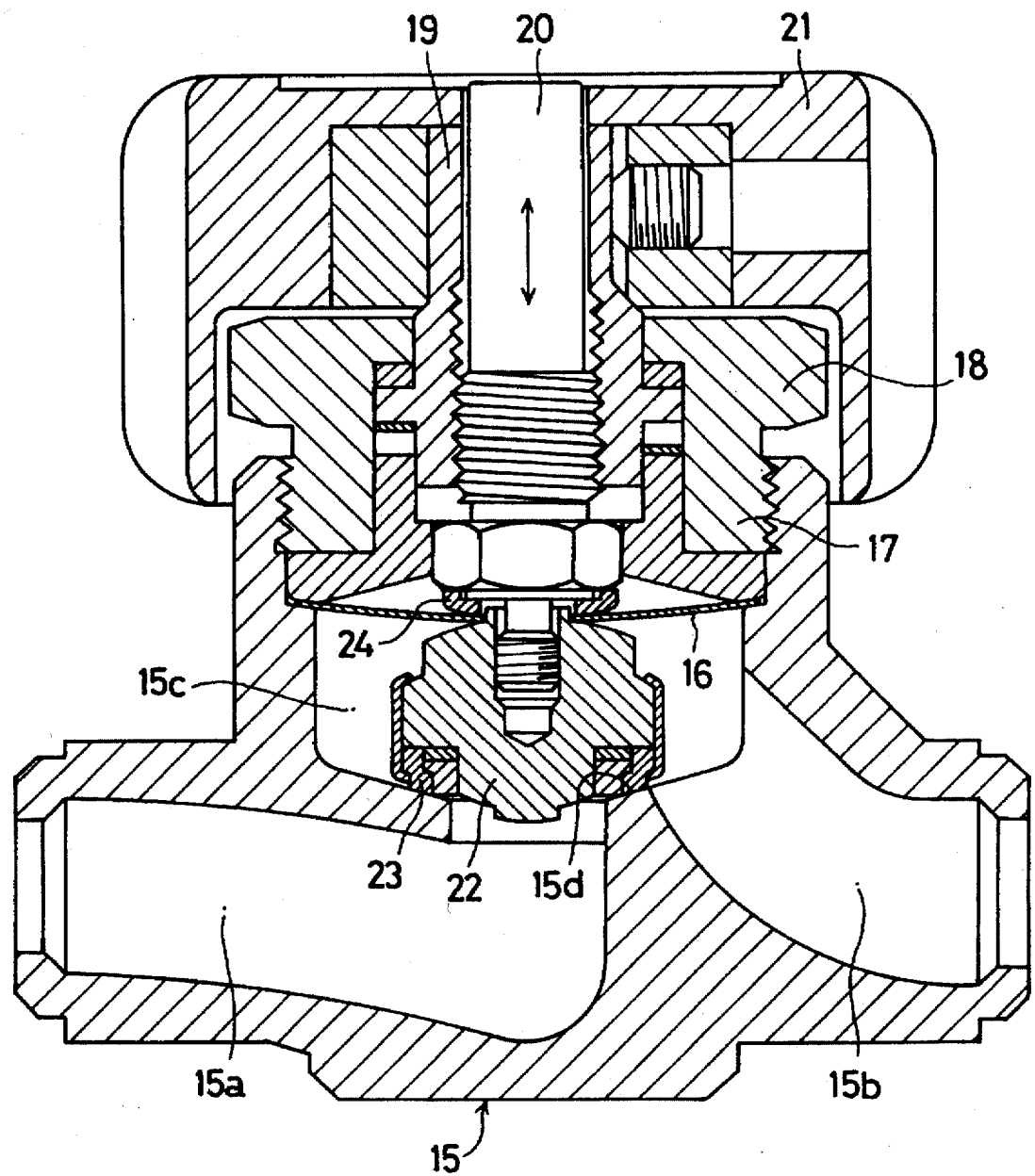
Figure 12:
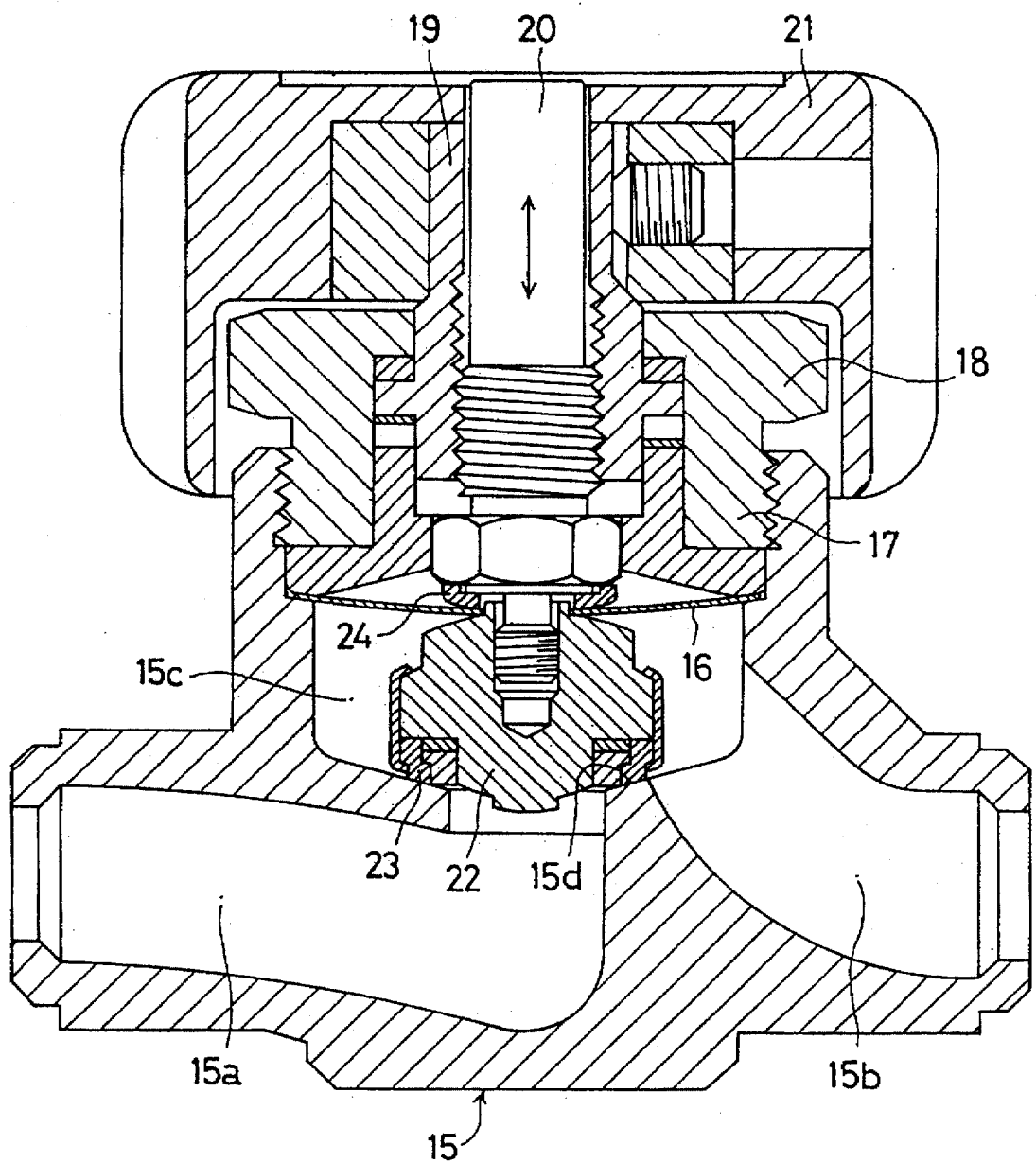

FIGS. 10 and 11 illustrate a fifth embodiment of the invention which differs only slightly from the fourth embodiment described above. As best seen in FIG. 11, the hub of the valve disk support portion 6i does not have a stepped portion extending downwardly into the mounting hole 2a in the diaphragm. Instead, the inner peripheral surface of diaphragm 2 bounding mounting hole 2a abuts the outer circumferential surface of the valve disk shaft portion 6b immediately below the location where the diameter of the shaft portion changes to form step 6k.

The diaphragm 2 and valve disk 6 are assembled by first positioning the diaphragm and then the valve disk support portion 6i on the shaft portion 6b from above, and then welding the parts together with an electron beam directed from above through the opening in the support portion. Therefore, the embodiment of FIG. 10 possesses the same advantages as the embodiment shown in FIG. 8.

In each of the above embodiments, the metallic diaphragm 2 is comprised of a plurality of very thin metallic plates, but the metallic diaphragm 2 may comprise a single thin metallic plate.

From the foregoing description it is evident that in a diaphragm valve constructed according to the present invention, the diaphragm is welded to the valve disk at a location spaced from the upper surface of the valve disk so that no narrow gap is formed between the bottom surface of the diaphragm and the valve disk, as in the case of conventional diaphragm valves. As a result, gas substitution performance is greatly improved as compared to that of conventional diaphragm valves.

In the case where the edge portion of the inner circumference of the metallic diaphragm is bent downward and placed in contact with the outer circumferential surface of the valve disk shaft portion, and the end portion of the inner circumference of the diaphragm is welded to the shaft portion of the disk, bending stress, generated when elastic deformation (bending) of the metallic diaphragm occurs, is applied to a position distanced from the weld zone. As a result, it is possible to prevent cracks from forming in the weld zone by avoiding the application of large stresses to the weld zone.

Furthermore, in the case were an annular supporting portion is provided at a position on the valve disk shaft portion above the metallic diaphragm and on the shaft portion of the disk in order to support the bend of the diaphragm, the supporting portion will support such bend as the diaphragm is deformed elastically. As a result, sharp bends do not occur in the diaphragm, and the durability of the diaphragm is improved.

In addition, since the edge portion of the inner circumference of the metallic diaphragm and the disk are welded in order to fasten and integrate them, it is not necessary to clamp the edge portion of the inner circumference of the metallic diaphragm with a holding metal fitting hence the number of parts can be reduced.

In the described embodiments, the stem 4 is manually moved up and down, but the invention is equally suitable for use in valves wherein the stem is moved by an actuator such as a fluid pressure cylinder and the like.

In each of the above embodiments, the metallic diaphragm 2 and the disk 6 are described as being welded by electron beam welding, but other welding methods, such as laser welding for example, may be used.

Other modifications and substitutions may be made in the described embodiments without departing from the spirit and scope of the invention as defined by the appended claims.

We claim:

1. A diaphragm valve comprising:

a valve body with a valve seat on the bottom of a concave valve chamber, the valve chamber communicating with an inflow passage and an outflow passage;

a metallic diaphragm having a center opening therein whereby said diaphragm exhibits an inner circumference with an edge portion and an outer circumferential edge portion, said metallic diaphragm being elastically deformable in a vertical direction and positioned in the valve chamber opposite the valve seat for maintaining air-tightness of the valve chamber;

a bonnet fixed to said valve body for clamping said outer circumferential edge portion of said metallic diaphragm against said valve body;

a stem inserted in and supported by said bonnet, said stem being movable up and down through said bonnet; and, a valve disk, said valve disk comprising a disk-like seat portion making contact with and moving away from said valve seat, a shaft portion extending from a top surface of said seat portion through said center opening in said metallic diaphragm, and a connecting portion connected to said shaft portion and to a bottom end portion of said stem, and a weld joint fastening and integrating said end edge portion of the inner circumference of said metallic diaphragm to said shaft portion around the entire circumference of said shaft portion, said weld joint being spaced from said seat portion by a gap which extends across the entire extent of the diaphragm from the edge portion of the inner circumference to the outer circumferential edge portion.

2. A diaphragm valve according to claim 1 wherein said metallic diaphragm comprises a plurality of metallic plates laid one on top of another.

3. A diaphragm valve according to claim 2, wherein said end edge portion of the inner circumference of the metallic diaphragm is bent downward and contacts the surface of the outer circumference of said shaft portion of said valve disk.

4. A diaphragm valve according to claim 3, wherein said shaft portion includes a rib extending around the outer circumference of said shaft portion, said end edge portion of the inner circumference of said metallic diaphragm resting on said rib and integrated with said rib by said weld joint.

5. A diaphragm valve according to claim 2, wherein said valve disk further comprises an annular supporting portion for supporting a portion of said metallic diaphragm that is elastically deformed as said stem moves, said annular supporting portion extending from said shaft portion at a position above said metallic diaphragm.

6. A diaphragm valve according to claim 2, wherein said shaft portion includes a rib extending around the outer circumference of said shaft portion, said end edge portion of the inner circumference of said metallic diaphragm resting on said rib and integrated with said rib by said weld joint.

7. A diaphragm valve according to claim 2, wherein said shaft portion has an outer peripheral surface with a step, and the edge portion of the inner circumference of the metallic diaphragm is bent downward and further bent inward so that said end edge portion of the inner circumference of said metallic diaphragm contacts said outer peripheral surface at said step, said weld joint fastening said end edge of the inner circumference of said metallic diaphragm to said shaft portion at said step.

8. A diaphragm valve according to claim 1, wherein said end edge portion of the inner circumference of the metallic diaphragm is bent downward and contacts the surface of the outer circumference of said shaft portion of said valve disk.

9. A diaphragm valve according to claim 3, wherein said shaft portion includes a rib extending around the outer circumference of said shaft portion, said end edge portion of the inner circumference of said metallic diaphragm resting on said rib and integrated with said rib by said weld joint.

10. A diaphragm valve according to claim 1, wherein said valve disk further comprises an annular supporting portion for supporting a portion of said metallic diaphragm that is elastically deformed as said stem moves, said annular supporting portion extending from said shaft portion at a position above said metallic diaphragm.

11. A diaphragm valve according to claim 1, wherein said shaft portion includes a rib extending around the outer circumference of said shaft portion, said end edge portion of the inner circumference of said metallic diaphragm resting on said rib and integrated with said rib by said weld joint.

12. A diaphragm valve according to claim 1, wherein said shaft portion has an outer peripheral surface with a step, and the edge portion of the inner circumference of the metallic diaphragm is bent downward and further bent inward so that said end edge portion of the inner circumference of said metallic diaphragm contacts said outer peripheral surface at said step, said weld joint fastening said end edge of the inner circumference of said metallic diaphragm to said shaft portion at said step.

13. A diaphragm valve as claimed in claim 1 wherein said valve disk includes a supporting portion having a hub with an opening therein, said hub resting on a step provided on said shaft portion, said end edge of the inner circumference of said metallic diaphragm being joined by said weld joint to said hub and to said shaft portion in the region of said step, said supporting portion extending outwardly and upwardly from said hub above said metallic diaphragm to support said metallic diaphragm as said metallic diaphragm elastically deforms in response to up and down movement of said stem.

14. A diaphragm valve as claimed in claim 13, wherein said hub has a flat bottom surface which partially rests on said step and extends radially outwardly of said shaft portion, said end edge portion of the inner circumference of said metallic diaphragm abutting said shaft portion.

15. A diaphragm valve as claimed in claim 13, wherein said hub has a downwardly extending annular projection surrounding the opening therein, said annular projection resting on said step, said end edge portion of the inner circumference of said metallic diaphragm abutting said annular projection.

16. A diaphragm valve as claimed in claim 1, wherein said valve disk comprises a first element having a threaded top portion and including said seat portion, and a second, monolithic, element comprising said connecting portion and said shaft portion, said second element being internally threaded for receiving said threaded top portion of said first element.

17. A diaphragm valve as claimed in claim 1, wherein said valve disk comprises a first, monolithic element including said seat portion and said shaft portion and a second element comprising said connecting portion.

* * * * *